United States Patent
Sato et al.

(10) Patent No.: US 7,408,276 B2
(45) Date of Patent: Aug. 5, 2008

(54) PLANE MOTOR DEVICE WITH SURROUNDING MEMBER SURROUNDING COIL UNIT AND WITH COOLING CHANNEL PROVIDED WITHIN SURROUNDING MEMBER

(75) Inventors: Hitoshi Sato, Tochigi (JP); Yasuhito Sasaki, Tochigi (JP); Yoshikazu Miyajima, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 375 days.

(21) Appl. No.: 10/832,361

(22) Filed: Apr. 27, 2004

(65) Prior Publication Data

US 2004/0222707 A1 Nov. 11, 2004

(30) Foreign Application Priority Data

May 6, 2003 (JP) ............................. 2003-128182
May 7, 2003 (JP) ............................. 2003-128678

(51) Int. Cl.
*H02K 41/00* (2006.01)
(52) U.S. Cl. .......................................... 310/12; 310/16
(58) Field of Classification Search .................. 310/12, 310/52–54, 13, 16
See application file for complete search history.

(56) References Cited

U.S. PATENT DOCUMENTS

| | | | |
|---|---|---|---|
| 6,226,073 B1 | 5/2001 | Emoto | 355/53 |
| 6,266,133 B1 | 7/2001 | Miyajima et al. | 355/72 |
| 6,320,649 B1 | 11/2001 | Miyajima et al. | 355/72 |
| 6,552,773 B2 | 4/2003 | Emoto | 355/53 |
| 6,555,936 B1 * | 4/2003 | Tanaka et al. | 310/12 |
| 6,583,859 B2 | 6/2003 | Miyajima et al. | 355/72 |
| 6,608,407 B2 * | 8/2003 | Kawada | 310/12 |
| 6,777,832 B2 * | 8/2004 | Watanabe | 310/12 |
| 2002/0081528 A1 | 6/2002 | Miyajima et al. | 430/302 |
| 2003/0141769 A1 * | 7/2003 | Kubo | 310/12 |

* cited by examiner

*Primary Examiner*—Thanh Lam
(74) *Attorney, Agent, or Firm*—Fitzpatrick, Cella, Harper & Scinto

(57) ABSTRACT

A plane motor device that includes a stator unit, a movable unit movable along a plane above the stator unit, first and second coil units at one or both of the movable unit and the stator unit, in which coil units a current flows for driving the coil unit, and an enclosure partitioned into a plurality of separate regions. The enclosure encloses the first and second coil units in two respective regions of the plurality of separate regions. Each of the two regions has a cooling channel through which cooling refrigerant flows separately from the cooling channel of the other region.

2 Claims, 9 Drawing Sheets

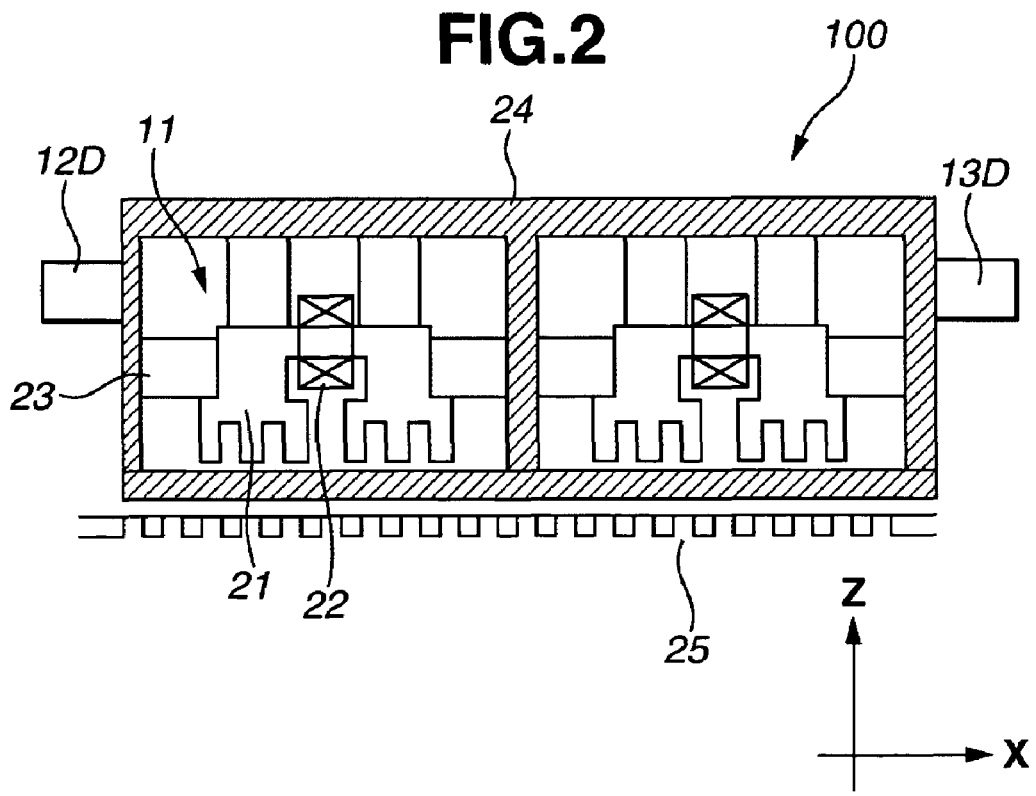
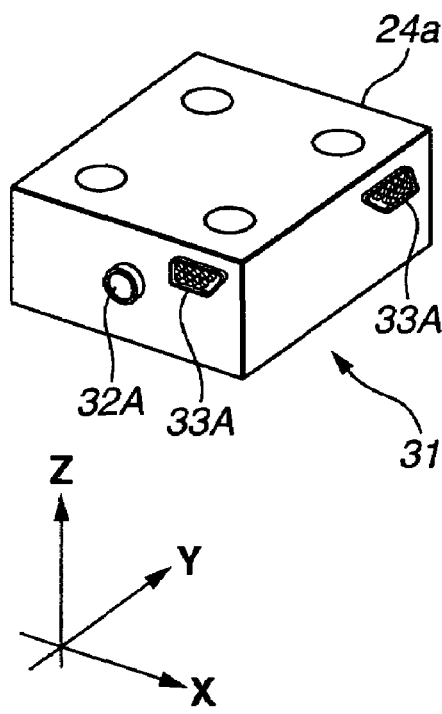
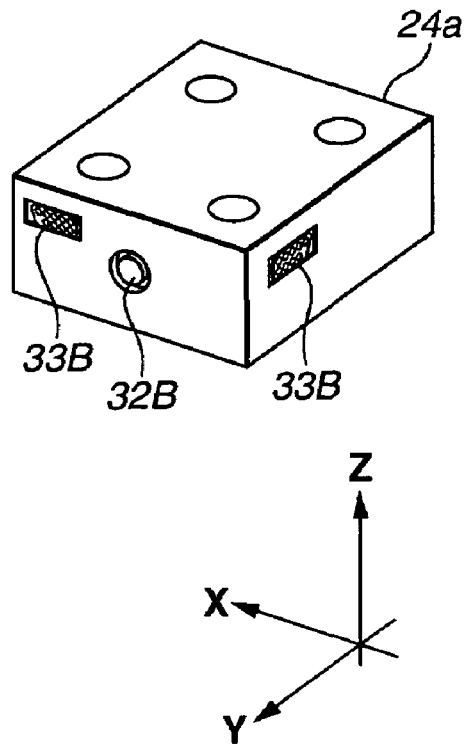

PLANE MOTOR DEVICE WITH SURROUNDING MEMBER SURROUNDING COIL UNIT AND WITH COOLING CHANNEL PROVIDED WITHIN SURROUNDING MEMBER

BACKGROUND OF THE INVENTION

1. Field of the Invention

The present invention relates to a plane motor suitable for a stage apparatus used for moving or positioning a substrate, the substrate being in a precision machine, such as a semiconductor exposure apparatus, or the like. A stage apparatus using the plane motor of the invention is used, for example, as a reticle stage or a wafer stage for sequentially moving a reticle or a silicon wafer with respect to a projection exposure system when performing projection exposure of the pattern of the reticle onto the silicon wafer in a projection exposure apparatus for transferring the pattern of the reticle onto the silicon wafer, the silicon wafer serving as a substrate to be exposed, in a semiconductor manufacturing process.

2. Description of the Related Art

In the field of high-precision apparatuses, such as semiconductor manufacturing apparatuses, and the like, in order to perform very precise position control at a high speed without depending on mechanical accuracy, and to obtain a long life by preventing mechanical friction, stage apparatuses for performing XY two-dimensional position control by driving a movable member in a two-dimensional direction in a non-contact state are being developed. Plane motors according to a variable reluctance driving method or an electromagnetic-force driving method using a Lorentz's force are used as driving sources for such stage apparatuses.

FIG. 10 illustrates a conventional stage apparatus used in a projection exposure apparatus. In FIG. 10, a stage apparatus 55 sequentially moves a substrate (wafer) 64 at each exposure operation. Reference numeral 61 represents a stage surface plate. A movable slider 62 is driven on the stage surface plate 61 in a two-dimensional direction in a non-contact state. An illuminance sensor 63 provided on the upper surface of the movable slider 62 performs calibration measurement of illuminance of exposing light before exposure in order to correct the amount of exposure. A wafer-conveying robot 57 supplies the stage apparatus 55 with the wafer 64. The wafer 64 is obtained by coating a resist on the surface of a single-crystal silicon substrate, in order to be subjected to projection transfer of a reticle pattern depicted on a reticle substrate via a reduction exposure system. An X-interferometer mirror 65 is a target for measuring the position of the movable slider 62 of the stage apparatus 55 in the X direction using a laser interferometer. Reference numeral 65A represents X-interferometer measuring light. An X-interferometer base 65B holds and positions the X-interferometer mirror 65. A Y-interferometer mirror 66 is a target for measuring the position of the movable slider 62 in the Y direction. Reference numeral 66A represents Y-interferometer measuring light. A Y-interferometer base 66B holds and positions the Y-interferometer mirror 66. In this and all other figures, X, Y and Z represent the respective directions (i.e., axes).

At present, a variable-reluctance-driving-type linear pulse motor is mainly used as the plane motor used in the stage apparatus shown in FIG. 10. This plane pulse motor includes the stage surface plate 61 on which comb-shaped magnetic members are arranged with an equal interval, and the movable slider 62 in which a plurality of armature coils having comb-shaped portions having a different phase facing the comb-shaped magnetic members and a permanent magnet form a yoke. By changing reluctance by causing a current to flow in the armature coils, a thrust for driving the movable slider 62 is generated. By controlling a pulse current supplied to each of the armature coils, a stepping operation is performed.

Although the above-described plane motor can perform very precise positioning and has excellent thrust linearity, a large current must be supplied in order to obtain a large thrust, thereby causing a problem of heating of the armature coils. Accordingly, in order to mitigate thermal influence, a design of cooling using a refrigerant, or the like, is in progress. However, since a yoke having armature coils generates a strong thrust, it is bonded to the movable slider using resin or an organic compound. Accordingly, it is difficult to form a refrigerant channel for efficiently cooling the armature coils. FIG. 11 illustrates a conventional cooling structure. In FIG. 11, there are shown a cooling-refrigerant inlet 71, a cooling-refrigerant outlet 72, and a cooling-channel direction 73. According to such a cooling method, heating of a corner portion 74 cannot be suppressed.

A plane motor according to an electromagnetic-force driving method using a Lorentz's force includes the stage surface plate 61 in which a permanent magnet magnetized so as to arrange a plurality of pairs of an S pole and an N pole with an equal interval is disposed, and the movable slider 62 in which an air-core armature coil wound so as to face the permanent magnet is disposed. In the plane motor of this type, by causing a current to flow in the armature coil, a Lorentz's force according to the Fleming's left-hand rule is generated to drive the movable slider 62. In this case, also, a structure for efficiently cooling the armature coil has been desired.

As described above, in plane pulse motors for stage apparatuses, although design of cooling has been proceeding in order to suppress influence by heat, a cooling structure having better efficiency is being requested. Furthermore, since the current movable slider and stage surface plate are integrated, an integrated structure must be newly manufactured when there is a change in specifications, such as an increase in the thrust, or the like.

SUMMARY OF THE INVENTION

The present invention has been made in consideration of the above-described problems.

It is an object of the present invention to provide a cooling structure having better efficiency for suppressing heating of corner portions of a movable slider including an armature coil in a plane motor.

It is another object of the present invention to allow a change in the shape of a plane motor without newly manufacturing an integrated structure of the plane motor.

According to one aspect of the present invention, a plane motor device having an armature coil at a movable unit and/or a stator unit in which the movable unit moves in a two-dimensional direction on a plane above the stator unit by causing a current to flow in the armature coil includes a surrounding member surrounding the armature coil, and a refrigerant cooling channel provided within the surrounding member, for absorbing heat of the armature coil. According to this structure, the entire region of the movable unit including corner portions can be efficiently cooled. It is preferable that the surrounding member is divided into a plurality of regions. Temperature control is performed for each of the divided regions. It is preferable that the surrounding member is provided in the form of module units (modular units). By combining a plurality of module units, it is unnecessary to newly manufacture an integrated structure of the plane motor when changing the shape of the plane motor.

According to another aspect of the present invention, an exposure apparatus for repeatedly exposing a pattern depicted on a surface of an original plate onto a substrate by projecting the pattern onto the substrate via a projection optical system and relatively moving both of the original and the substrate, or only the substrate, with respect to the projection optical system using a stage apparatus includes the above-described plane motor device as the stage apparatus for relatively moving the original plate or the substrate, or only the substrate, with respect to the projection optical system.

According to still another aspect of the present invention, a method for manufacturing devices includes a step of manufacturing the devices using the above-described exposure apparatus.

In yet another aspect, the present invention relates to a plane motor device comprising (a) a stator unit which has a plane, (b) a movable unit movable along the plane, (c) a coil unit at one or both of the movable unit and the stator unit, in which coil unit a current flows for driving the movable unit, (d) a surrounding member surrounding the coil unit, and (e) a cooling channel provided within the surrounding member, for absorbing heat of the coil unit, wherein an inside of the surrounding member is divided into a plurality of regions.

In a still further aspect, the present invention relates to an exposure apparatus for repeatedly exposing a pattern depicted on a surface of an original plate onto a substrate by projecting the pattern onto the substrate via a projection optical system and relatively moving both of the original plate and the substrate, or only the substrate, with respect to the projection optical system using a stage apparatus, the exposure apparatus comprising a plane motor device as described above, the plane motor device being used as the stage apparatus for relatively moving the original plate or the substrate, or only the substrate, with respect to the projection optical system.

In a yet further aspect, the present invention relates to a method for manufacturing a device, comprising a step of manufacturing the device using an exposure apparatus as described above.

In another aspect, the present invention relates to a stage apparatus comprising (a) a base plate unit, and (b) at least one stage movable along the base plate unit, wherein the base plate unit includes a plurality of base plates, each of which has the same level.

In a further aspect, the present invention relates to a plane motor comprising a plurality of modules, each module comprising (a) a coil and (b) an enclosure surrounding the coil and including (i) a cooling refrigerant inlet, (ii) a cooling refrigerant outlet, and (iii) a cooling channel extending between the cooling refrigerant inlet and the cooling refrigerant outlet, through which channel cooling refrigerant flows to remove heat from the coil.

In yet another aspect, the present invention relates to a plane motor comprising a movable slider that is configured to two-dimensionally move along a plane above a stator unit, in non-contact relationship with respect to the stator unit, the movable slider comprising (a) first and second coil units configured to be energized when effecting the movement of the movable slider, and (b) an enclosure partitioned into a plurality of separate regions, the enclosure enclosing the first and second coil units in two respective regions of the plurality of separate regions, each of the two regions having a cooling channel through which cooling refrigerant flows separate from the cooling channel of the other region.

The foregoing and other objects, advantages, and features of the present invention will become more apparent from the following detailed description of the preferred embodiments taken in conjunction with the accompanying drawings.

BRIEF DESCRIPTION OF THE DRAWINGS

FIG. 2 is a diagram illustrating the inside of a jacket;

FIGS. 3A and 3B are diagrams, each illustrating a module according to the first embodiment;

DETAILED DESCRIPTION OF THE PREFERRED EMBODIMENTS

A plane pulse motor device according to the present invention includes a magnet and an armature coil for suppressing heating of corner portions of a movable slider including the armature coil. By causing a current to flow in the armature coil, a driving force is generated in cooperation with the magnet, and a movable member moves in a two-dimensional direction on a plane on a stage unit. A surrounding member for covering the armature coil is provided at the movable slider where the armature coil is disposed, and the surrounding member is divided into a plurality of regions.

In the above-described plane pulse motor device, it is preferable that temperature control is performed for each of refrigerant cooling channels for the divided regions of the surrounding member. It is also preferable to provide a mechanism for holding an armature yoke unit from the surrounding member. It is also preferable that the surrounding member covering the armature coil is provided in the form of module units, and the module units can be connected.

In the above-described plane motor device, it is preferable to provide a refrigerant cooling channel for cooling the armature coil, in a portion surrounded by each of the module units. It is also preferable that a pipe for the refrigerant used for cooling and electrodes of the armature coil are detachably mountable at a side of the module unit, by means of connection means. The present invention may be applied to a wafer stage, or a wafer stage and a reticle stage of a step-and-scan-type projection exposure apparatus called a scanner or a scanning exposure apparatus, or a step-and-repeat-type projection exposure apparatus called a stepper. In such a case, the substrate is an original plate or a substrate to be exposed. That is, the projection exposure apparatus of the invention may be an exposure apparatus for projecting a pattern depicted on the surface of an original plate onto a substrate to be exposed via a projection optical system, and repeatedly exposing the pattern onto the substrate by relatively moving both of the original plate and the substrate, or only the substrate, with respect to the projection optical system using a stage apparatus that includes the above-described plane motor device.

Preferred embodiments of the present invention will now be described.

First Embodiment

Figure 1A:
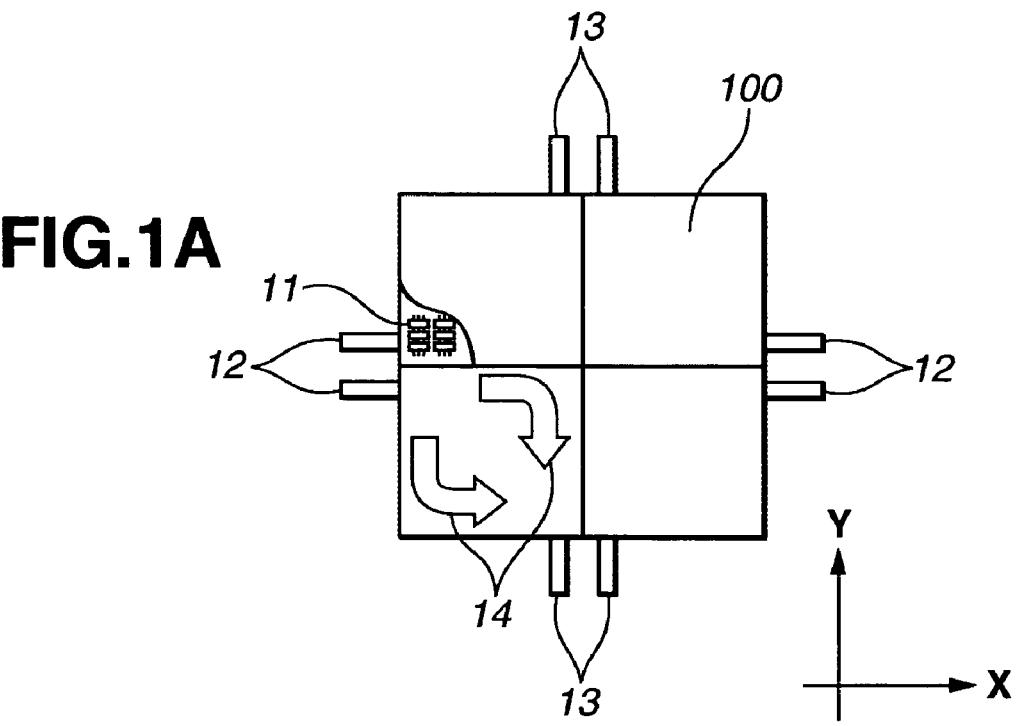
FIGS. 1A-1C are diagrams illustrating a plane motor according to a first embodiment of the present invention.

FIGS. 1A-3B are diagrams illustrating the configuration of a movable slider (movable unit) according to a first embodiment of the present invention. In FIG. 1A, there is shown a movable member 100 which has armature coil unit 11 which includes a plurality of armature coils. The movable member 100 also has a cooling-refrigerant inlet 12, and cooling-refrigerant outlet 13. FIG. 2 is a diagram illustrating a detail of the armature coil unit 11 in FIG. 1. In FIG. 2, there are shown a cooling-refrigerant inlet 12D, a cooling-refrigerant outlet 13D, a yoke 21 of the movable unit, an armature coil 22 having the yoke 21 as a core, and a supporting member 23 for supporting the yoke 21 and the armature coil 22. Reference numeral 100 denotes the movable slider. A jacket (surrounding member) 24 covers the armature coil 22, the yoke 21, a refrigerant, and the like, and is made of ceramics, metal or resin. A stator stage unit 25 is disposed so that a comb-shaped magnetic material faces the yoke 21. The movable slider 100 moves in a two-dimensional direction on a plane above the stator stage unit 25.

Figure 1B:
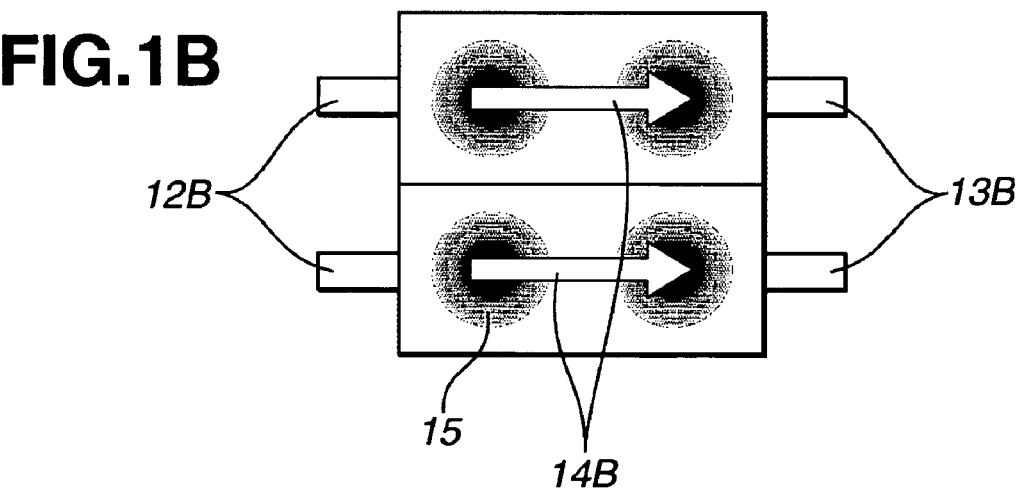
Figure 1C:
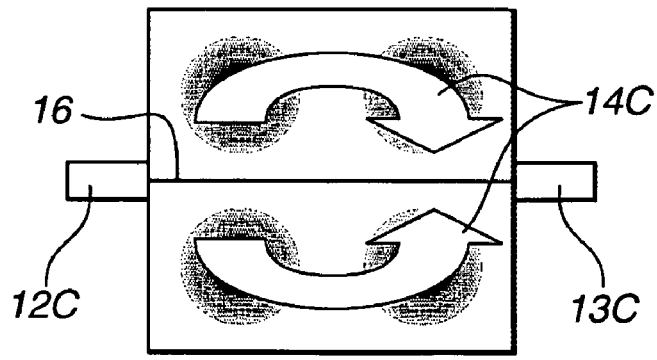

In order to drive the movable slider 100, a current is caused to flow in the armature coil 22. At that time, the armature coil 22 generates heat that is transferred to the yoke 21 to which the armature coil 22 is attached. Accordingly, in order to cool the yoke 21 heated by the heat from the armature coil 22, a refrigerant is fed into the movable slider 100 (via cooling-refrigerant inlet 12D). The refrigerant after completing circulation by removing the heat within the movable slider is sent from the cooling-refrigerant outlet 13D to the outside. In FIGS. 1A-1C, a refrigerant cooling channel identified by reference numeral 14 in FIGS. 1A, 14B in FIGS. 1B, and 14C in FIG. 1C, indicates the channel of the refrigerant. In FIG. 1B, reference numeral 15 represents a heat source, i.e., the position of the armature coil 22 or the yoke 21.

In FIG. 1, the armature coil unit 11 and the refrigerant cooling channel 14 are divided into four portions by jackets. FIG. 1B is a diagram illustrating a configuration in which the armature coil 11 and the refrigerant cooling channel 14B are divided into two portions. In these configurations having a plurality of refrigerant channels, cooling-refrigerant inlets designated by reference numeral 12 in FIGS. 1A, 12B in FIGS. 1B, and 12C in FIG. 1C, and cooling-refrigerant outlets designated by reference numeral 13 in FIGS. 1A, 13B in FIGS. 1B, and 13C in FIG. 1C, are provided by being adjusted with the number of regions divided by the jackets, and each of the jackets is independently subjected to temperature control. In FIG. 1C, the channel is not divided by jackets, but a plurality of (here, two) channels (14C) are provided using a partition 16.

In FIG. 2, when removing heat from the armature coil 22 and the yoke 21 in the plane pulse motor, it is difficult to perform very efficient cooling according a conventional approach in which the yoke 21 and the armature coil 22 are bonded within the movable slider. Accordingly, in order to resist against a thrust, the yoke 21 and the armature coil 22 are supported from the wall of the jacket 24 using the supporting member 23. Thus, much space is obtained between the jacket 24, and the yoke 21 and the armature coil 22, so that the contact area of the yoke 21 and the armature coil 22 with the refrigerant is increased, and more efficient cooling can be easily performed.

According to the above-described configuration, in the plane pulse motor device, by surrounding the armature coil provided at the movable unit with the jacket, dividing the inside of the jacket into a plurality of regions if necessary, and performing temperature control in a plurality of refrigerant channels, efficient cooling can be performed.

FIGS. 3A and 3B illustrate a case in which, when a jacket is divided, each divided jacket unit is provided as a module. In FIG. 3A, reference numeral 31 represents a module unit. A jacket (surrounding member) 24a has the shape of a polygon, and incorporates a plurality of armature coils 22 (see FIG. 2) and refrigerant channels for cooling heat from the armature coils 22. FIG. 3A is a perspective view of the module unit 31 as seen from the front side, and FIG. 3B is a perspective view of the module unit 31 as seen from the back. In FIG. 3A, a male pipe 32A is a tube for the refrigerant for cooling the armature coil 22. As shown in FIG. 3B, a female pipe 32B is provided at a facing side (at the back side) of the module unit 31, so that the female pipe 32B can be connected to the male pipe 32A when connecting two module units 31.

A male electrode 33A is for providing the armature with current. Similarly, a female electrode 33B is provided at a facing side (at the back side) of the module unit 31, so that the female electrode 33B can be connected to the male electrode 33A when connecting two module units 31. According to the above-described configuration, a plurality of module units 31 are easily detachably connectable, and tools and processes are unnecessary when connecting/detaching the module units 31.

Figures 4A, 4B:
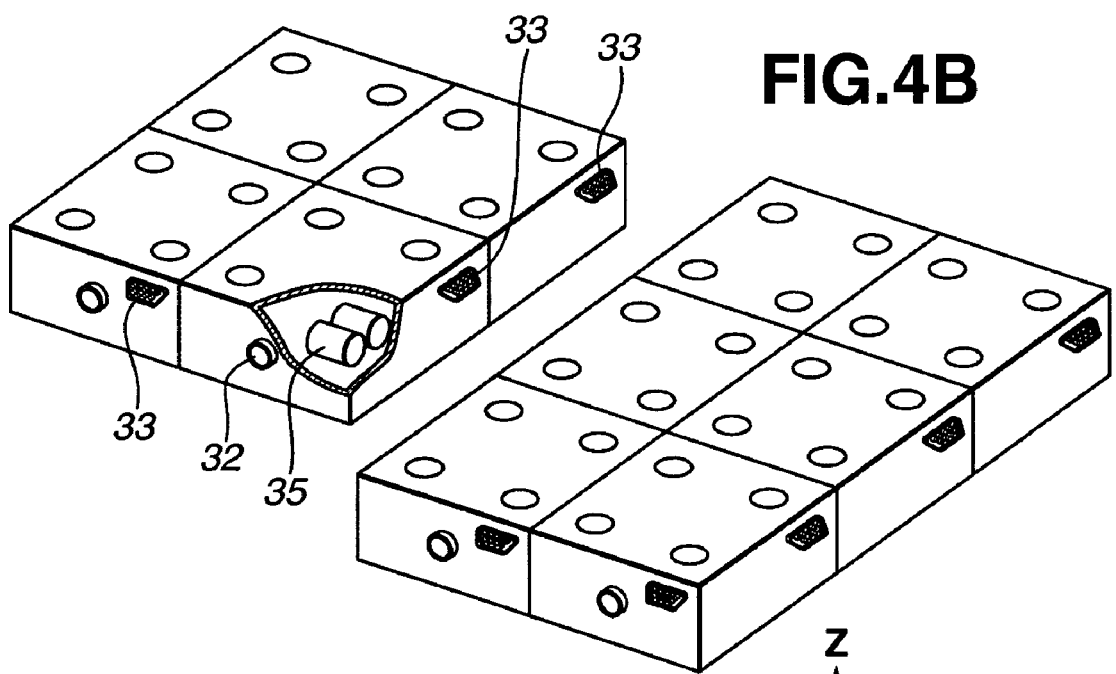
FIGS. 4A and 4B are diagrams illustrating connection of the modules shown in FIGS. 3A and 3B.

Each of FIGS. 4A and 4B illustrates a state in which a plurality of module units 31 shown in FIGS. 3A and 3B are connected together. FIG. 4A illustrates a case of connecting four module units, and FIG. 4B illustrates a case of connecting six module units. In FIG. 4A, a cooling-refrigerant pipe 32 is a pipe to be connected to the outside that is disposed at a side or the upper surface of the module unit 31 in order to cause the refrigerant to flow through a refrigerant channel designed in order to remove heat from the armature coil 35. The male pipe 32A or the female pipe 32B shown in FIG. 3A or 3B, respectively, may be used as the cooling-refrigerant pipe 32, and the male electrode 33A or the female electrode 33B shown in FIG. 3A or 3B, respectively, may be used as an armature-coil electrode 33. The armature-coil electrode 33 is disposed at a side or the upper surface of the module unit 31, in order to provide the armature coil 35 with current. By connecting adjacent module units 31 and electrodes 33, the module units 31 can be combined without considering the direction.

According to the above-described configuration, as shown in FIGS. 4A and 4B, only by combining a plurality of module units 31, changes in the specifications due to enlargement of the driving region, an increase of the thrust, or the like, can be effected without newly manufacturing an integrated structure of the moving member.

Second Embodiment

Figures 5A, 5B:
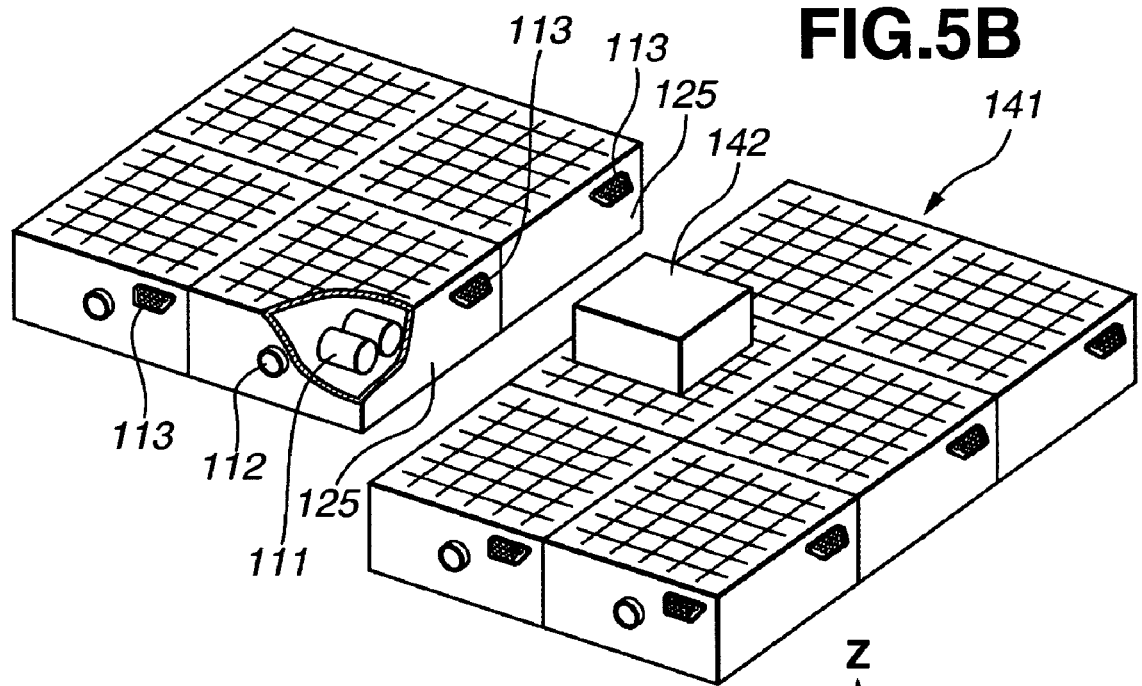
FIGS. 5A and 5B are diagrams illustrating a plane motor according to a second embodiment of the present invention.

FIGS. 5A and 5B are diagrams, each illustrating the configuration of a stage surface plate (stator unit) according to a second embodiment of the present invention. In the first embodiment, a coil is provided at the moving unit. In the second embodiment, however, a coil is provided at the stator unit. As in the first embodiment, cooling with a divided structure can also be applied to the stator unit. In FIGS. 5A and 5B, an armature coil 111 is fixed within a module unit 125 constituting a state surface plate 141. According to an electromagnetic force generated by causing a current to flow in the armature coil 111, a thrust is generated for a slider 142. The armature coil 111 is formed using an iron core or an air core. A cooling-refrigerant pipe 112 is a pipe to be connected to the outside that is disposed at a side or the lower surface of the module unit 125, in order to cause a refrigerant to flow in a refrigerant channel designed for removing heat from the armature coil 111. An armature coil electrode 113 is disposed at a side or the lower surface of the module unit 125, in order to provide the armature coil 111 with current. By connecting adjacent module units 125 and electrodes 113, it is possible to combine module units 125 without considering the direction. The module unit 125 has the shape of a polygon, and incorporates a plurality of armature coils 111 and cooling channels for cooling heat of the armature coils 111. According to the above-described configuration, as shown in FIGS. 5A and 5B, only by combining a plurality of module units 125, a change in specifications due to enlargement of the driving region, an increase of the thrust, or the like, can be dealt without newly manufacturing an integrated structure of the stage surface plate. FIG. 5A shows a case of connecting four module units 125, and FIG. 5B shows a case of connecting six module units 125. 125 without considering the direction. The module unit 125 has the shape of a polygon, and incorporates a plurality of armature coils 111 and cooling channels for cooling heat of the armature coils 111. According to the above-described configuration, as shown in FIGS. 5A and 5B, only by combining a plurality of module units 125, a change in specifications due to enlargement of the driving region, an increase of the thrust, or the like, can be dealt without newly manufacturing an integrated structure of the stage surface plate. FIG. 5A shows a case of connecting four module units 125, and FIG. 5B shows a case of connecting six module units 125.

Figure 6A:
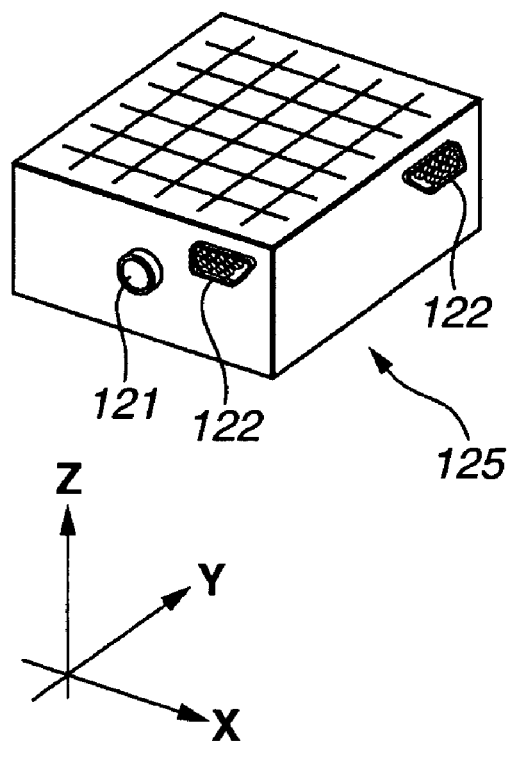
FIGS. 6A and 6B are diagrams, each illustrating a module according to the second embodiment.
Figure 6B:
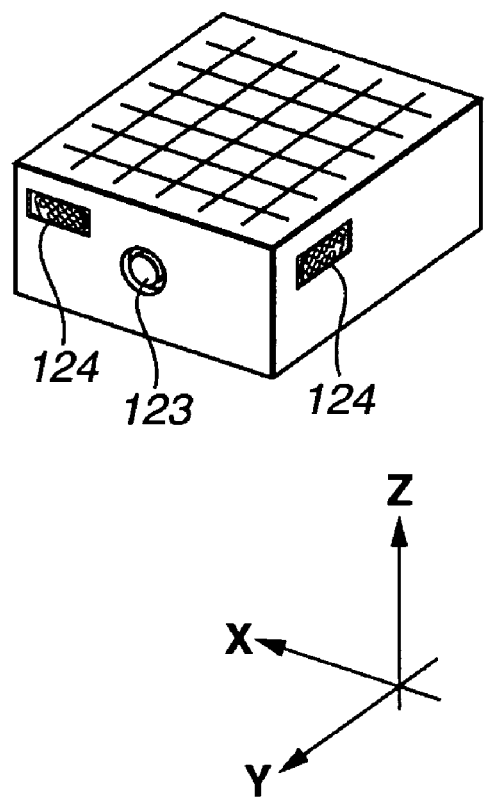

FIGS. 6A and 6B illustrate a preferable configuration of the module unit 125. FIG. 6A is a perspective view of the module unit 125 as seen from the front side, and FIG. 6B is a perspective view of the module unit 125 as seen from the back. In FIG. 6A, a male pipe 121 is a pipe for the refrigerant for cooling the armature coil 111. As shown in FIG. 6B, a female pipe 123 is provided at a facing side (at the back side) of the module unit 125, so that the female pipe 123 can be connected to the male pipe 121 when connecting two module units 125. A male electrode 122 is for providing the armature 111 with current. Similarly, a female electrode 124 is provided at a facing side (at the back side) of the module unit 125, so that the female electrode 124 can be connected to the male electrode 122 when connecting two module units 125. According to the above-described configuration, a plurality of module units 125 are easily detachably connectable, and tools and processes are unnecessary when connecting/detaching the module units 125.

Third Embodiment

Figure 7:
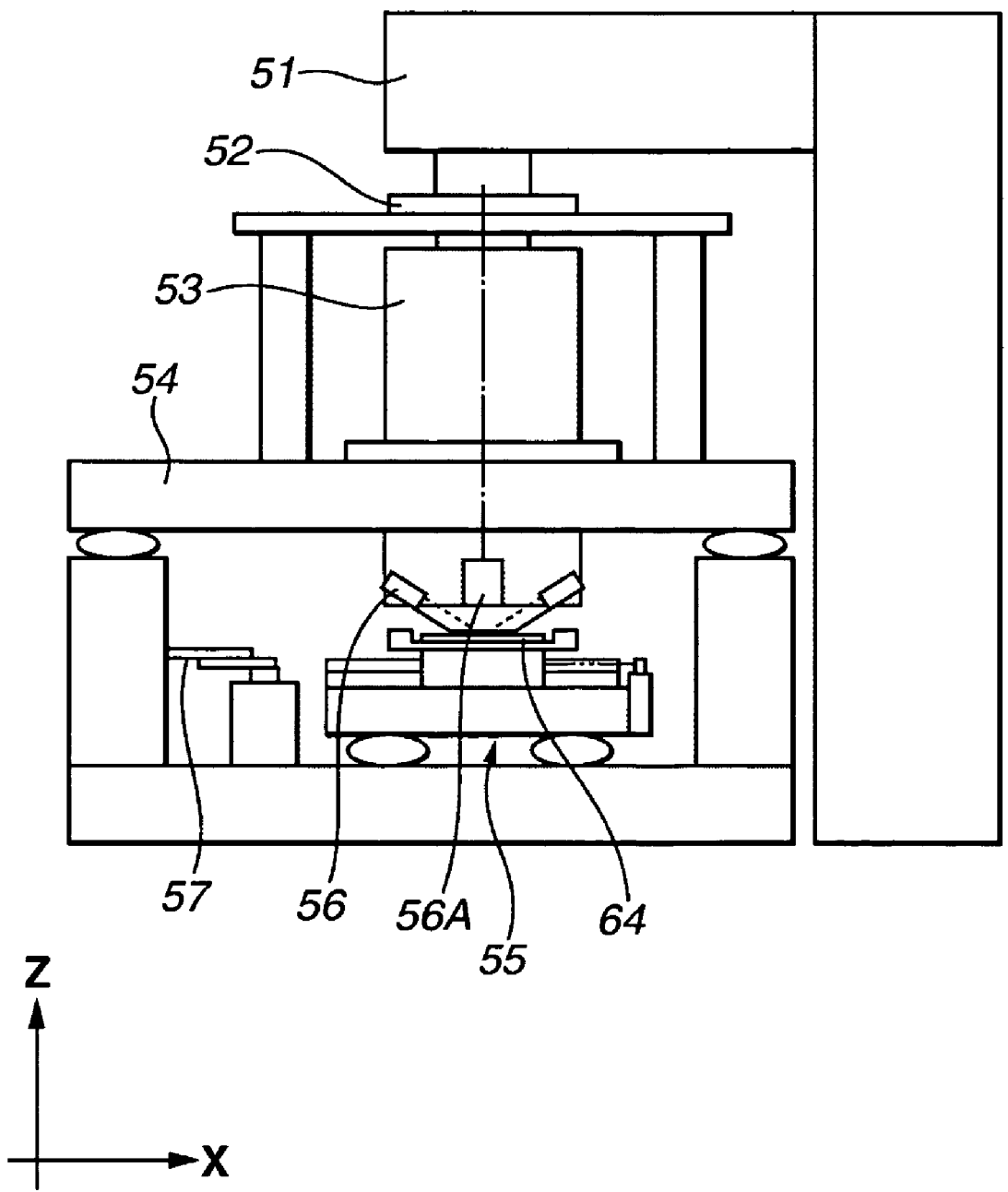
FIG. 7 is a diagram illustrating an exposure apparatus according to a third embodiment of the present invention.

FIG. 7 illustrates a third embodiment of the present invention. In the third embodiment, a plane pulse motor according to the present invention is applied to a stage apparatus of a projection exposure apparatus. In FIG. 7, an illuminating-system unit 51 projects exposure light from an exposure light source (not shown) onto a reticle after shaping the light. A reticle stage 52 mounts a reticle, serving as an original plate of an exposure pattern, and performs a scanning operation of the mounted reticle with respect to a wafer 64 with a predetermined reduction exposure ratio. A reduction projection lens 53 performs reduction exposure of the original pattern onto the wafer 64. There are also shown an exposure-apparatus main body 54, and a wafer stage (stage apparatus) 55. The reticle stage 52 supports the reduction projection lens 53 and the wafer stage 55. The wafer stage 55 moves the wafer 64 stepwise to a sequential exposure position, and performs a scanning operation of the wafer 64 during the scanning operation of the reticle in synchronization therewith.

A focus-scope 56 measures the focus of the wafer 64 from a barrel of the reduction projection lens 53. An alignment-scope 56A is a microscope for measuring an alignment mark (not shown) on the wafer 64 and an alignment reference mark (not shown) on the wafer stage 55, and performs alignment within the wafer 64 and alignment between the reticle 52 and the wafer 64. A wafer conveying robot 57 supplies the wafer stage 55 with the wafer 64. According to the above-described configuration, an exposure apparatus is obtained. By using the plane pulse motor device described in the first and second embodiments (i.e., by using the plane pulse motor device in the wafer stage 55 for effecting movement of the wafer 64), the effects described in the first and second embodiments can be obtained. Although in the third embodiment, a case in which the plane motor is applied to a so-called scanner, the present invention may also be applied to any other type of exposure apparatus, such as a stepper, or the like, or a semiconductor manufacturing apparatus other than the exposure apparatus, or a precision machine, such as a scanning electron microscope, or the like.

Fourth Embodiment

Figure 8:
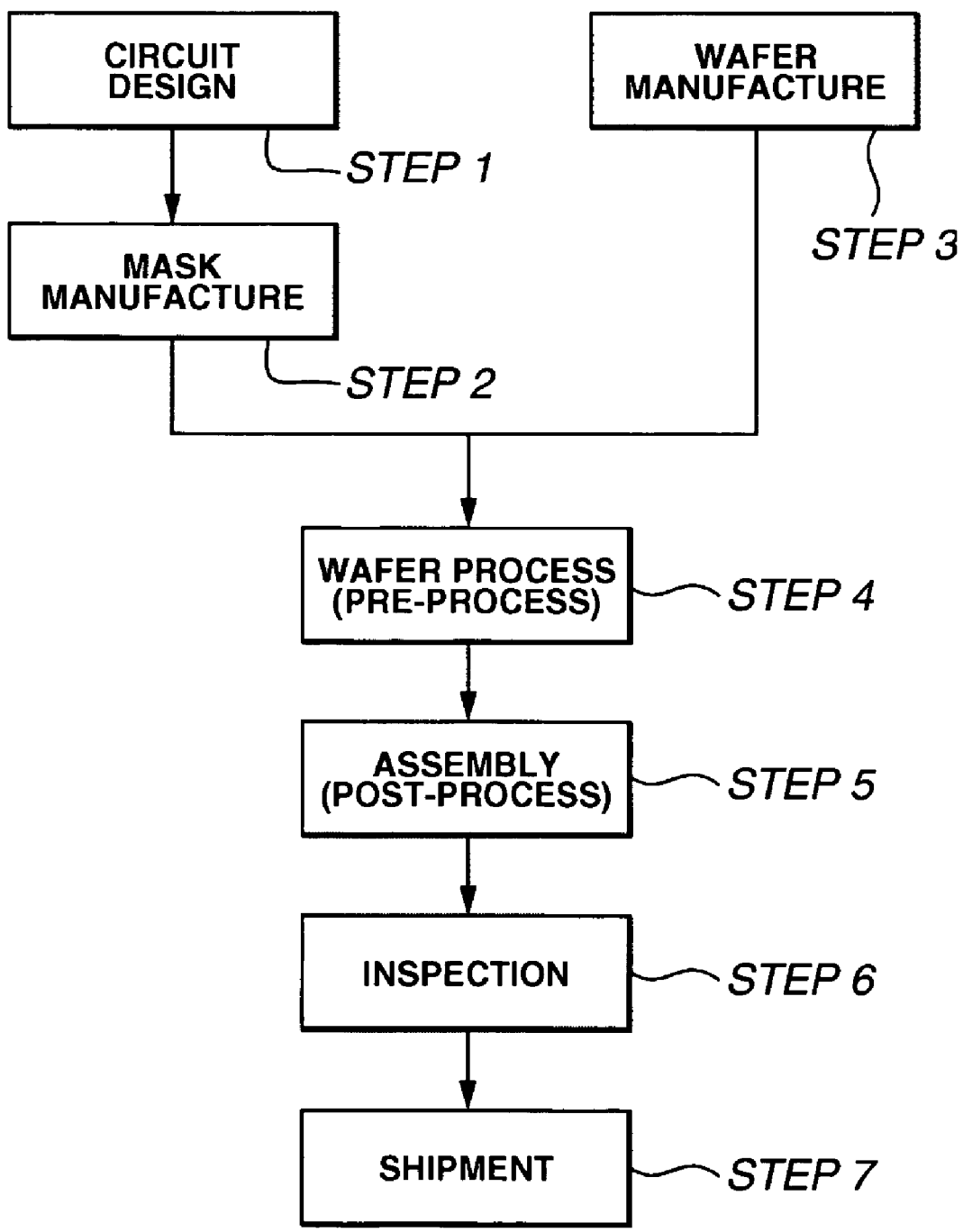
FIG. 8 is a diagram illustrating a device manufacturing process according to a fourth embodiment of the present invention.

FIG. 8 is a flowchart illustrating the overall semiconductor-device manufacturing process. A semiconductor-device manufacturing process utilizing the exposure apparatus of the third embodiment will be described.

In step 1 (circuit design), circuit design of semiconductor devices is performed. In step 2 (mask manufacture), masks are manufactured based on the designed circuit pattern.

In step 3 (wafer manufacture), wafers are manufactured using a material, such as silicon, or the like. Step 4 (wafer process) is called a pre-process, in which actual circuits are formed on the wafers by means of lithography by the exposure apparatus using the above-described masks and wafers. The nest step, step 5 (assembly), is called a post-process, which manufactures semiconductor chips using the wafers manufactured in step 4, and includes an assembling process (dicing and bonding), a packaging process (chip encapsulation), and the like. In step 6 (inspection), operation confirming tests, durability tests, and the like, for the semiconductor devices manufactured in step 5 are performed. The manufacture of the semiconductor devices is completed after passing through these processes, and the manufactured devices are shipped in step 7.

Figure 9:
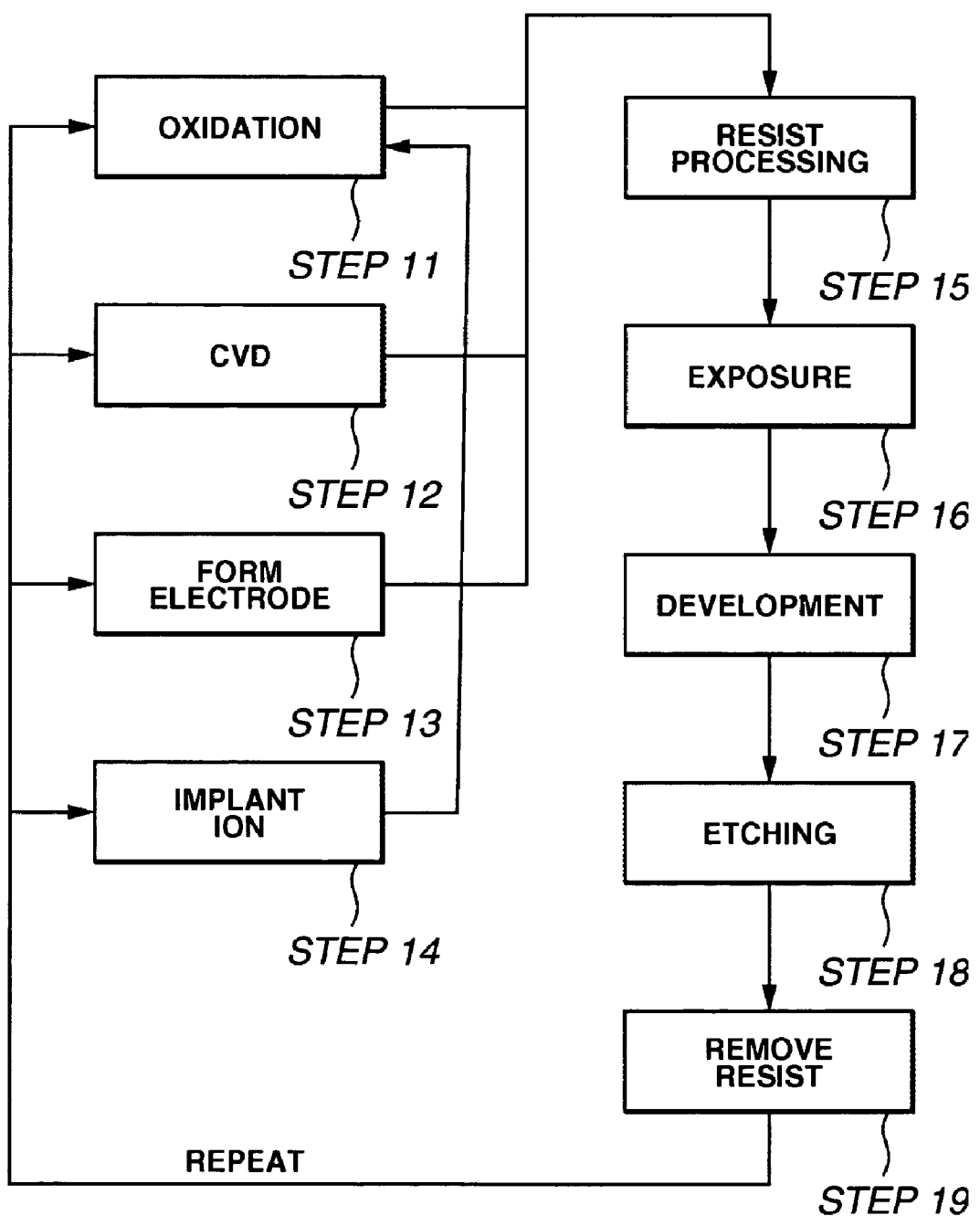
FIG. 9 is a diagram illustrating a wafer process shown in FIG. 8.
Figure 10:
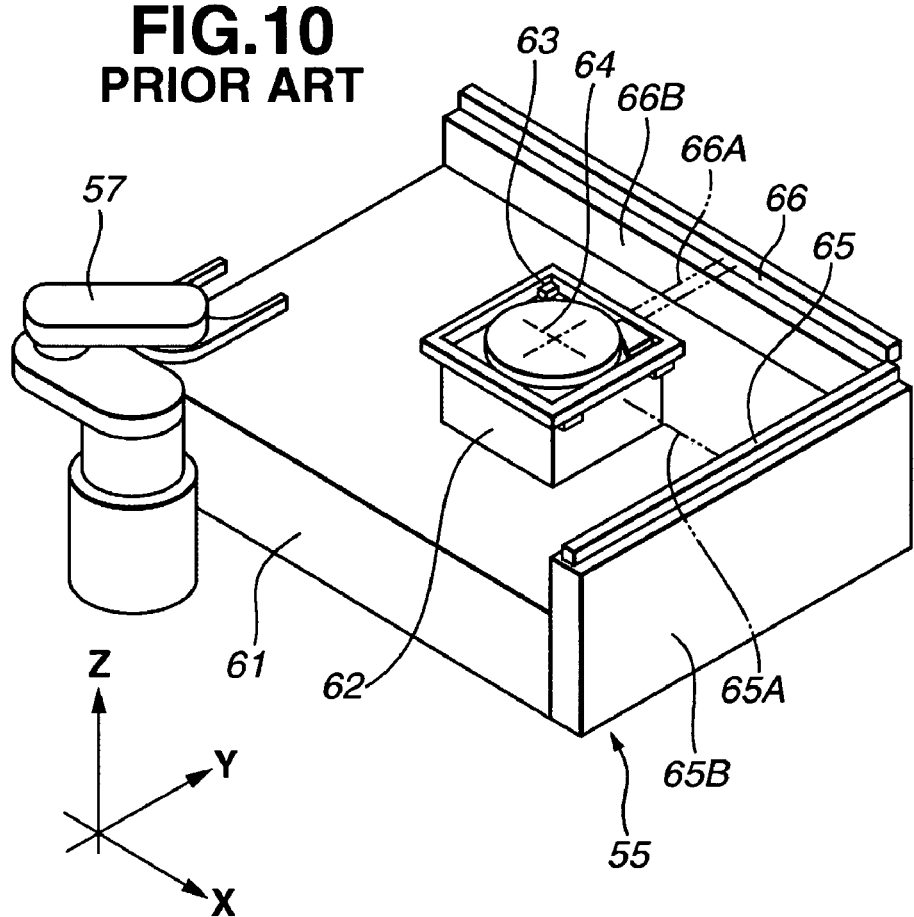
FIG. 10 is a diagram illustrating a conventional stage apparatus.
Figure 11:
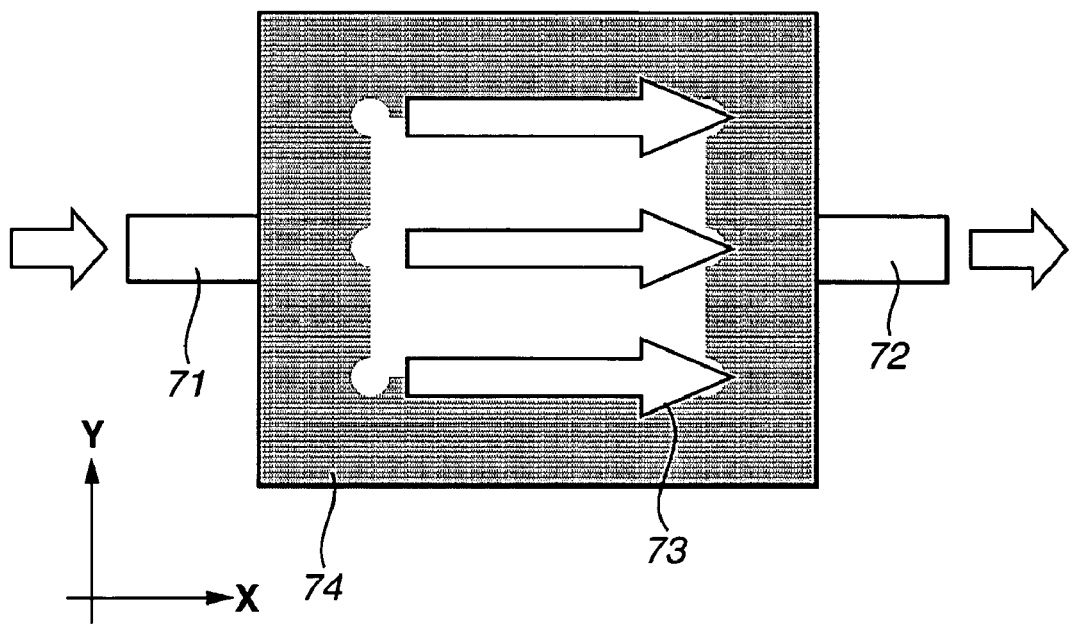
FIG. 11 is a diagram illustrating conventional cooling.

The above-described wafer process of step 4 has the following steps, i.e., as shown in FIG. 9, an oxidation step 11 in which the surface of the wafer is oxidized, a CVD (chemical vapor deposition) step 12 in which an insulating film is formed on the surface of the wafer, an electrode forming step 13 in which electrodes are formed on the surface of the wafer by vacuum deposition, an ion implantation step 14 in which ions are implanted into the wafer, a resist process step 15 in which a photosensitive material is coated on the wafer, an exposure step 16 in which the circuit pattern is transferred onto the wafer after the resist process step 15 using the exposure apparatus, a developing step 17 in which the wafer exposed in the exposing step 16 is developed, an etching step 18 in which portions other than the resist image developed in the developing step 17 is etched off, and a resist separation step 19 in which the resist that becomes unnecessary after the completion of the etching is removed. By repeating these steps, a final circuit pattern made of multiple patterns is formed on the wafer.

According to the present invention, in a plane motor, more efficient cooling can be performed. In a stage apparatus using the plane motor, by providing the plane motor in the form of modules, it is possible to allow a change in the shape of the plane motor without newly manufacturing an integrated structure of the plane motor.

Except as otherwise disclosed herein, the individual components shown in outline or in block form in the drawings are all well known in the plane motor device arts and their specific construction and operation are not critical to the making or operation of this invention or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A plane motor comprising:

a stator unit; and a movable unit movable along a surface of said stator unit, wherein one of said movable unit and said stator unit includes a plurality of module units each having a coil unit, and a cooling channel through which cooling refrigerant flows to remove heat from said coil unit, said cooling channel being connectable to a cooling channel of the other module unit, and wherein said one of said movable unit and said stator unit that includes said plurality of module units includes openings to said cooling channel on opposite sides of said one of said movable unit and said stator unit.

2. A plane motor according to claim 1, wherein said stator unit includes a plurality of said module units and each module unit has a guiding surface for guiding said movable unit.

* * * * *

UNITED STATES PATENT AND TRADEMARK OFFICE
CERTIFICATE OF CORRECTION

PATENT NO. : 7,408,276 B2
APPLICATION NO. : 10/832361
DATED : August 5, 2008
INVENTOR(S) : Hitoshi Sato et al.

Page 1 of 1

It is certified that error appears in the above-identified patent and that said Letters Patent is hereby corrected as shown below:

COLUMN 3:
Line 64, "separate" should read -- separately --.

COLUMN 5:
Line 58, "according a" should read -- according to a --.

COLUMN 7:
Line 6, "armature coil" should read -- armature-coil --.
Line 17, "dealt without" should read -- dealt with without --.
Line 21, "125. 125 without considerating the direction. The module unit" should read -- 126. --.
Lines 22-31, should be deleted.

COLUMN 8:
Line 39, "nest" should read -- next --.

Signed and Sealed this

Sixth Day of January, 2009

JON W. DUDAS
*Director of the United States Patent and Trademark Office*